US012095367B2

United States Patent
Avestruz et al.

(10) Patent No.: US 12,095,367 B2
(45) Date of Patent: Sep. 17, 2024

(54) CYCLE-BY-CYCLE DIGITAL CONTROL OF DC-DC CONVERTERS

(71) Applicant: The Regents of the University of Michigan, Ann Arbor, MI (US)

(72) Inventors: Al-Thaddeus Avestruz, Ann Arbor, MI (US); Xiaofan Cui, Ann Arbor, MI (US)

( * ) Notice: Subject to any disclaimer, the term of this patent is extended or adjusted under 35 U.S.C. 154(b) by 0 days.

(21) Appl. No.: 17/348,705

(22) Filed: Jun. 15, 2021

(65) Prior Publication Data

US 2021/0399639 A1    Dec. 23, 2021

Related U.S. Application Data

(60) Provisional application No. 63/039,230, filed on Jun. 15, 2020.

(51) Int. Cl.
| | | |
|---|---|---|
| H02M 3/158 | (2006.01) | |
| H02M 1/00 | (2006.01) | |
| H02M 3/156 | (2006.01) | |
| H02M 3/157 | (2006.01) | |

(52) U.S. Cl.
CPC ....... *H02M 3/1566* (2021.05); *H02M 1/0009* (2021.05); *H02M 3/157* (2013.01); *H02M 3/158* (2013.01)

(58) Field of Classification Search
CPC ....... H02M 3/1566; H02M 3/156–158; H02M 3/1588; H02M 1/0032; H02M 1/0035; H02M 1/16; H02M 1/0064; H02M 1/0009
See application file for complete search history.

(56) References Cited

U.S. PATENT DOCUMENTS

| | | | | |
|---|---|---|---|---|
| 2008/0278123 | A1* | 11/2008 | Mehas | H02M 3/1588 323/266 |
| 2011/0018516 | A1* | 1/2011 | Notman | H02M 3/1588 323/284 |
| 2011/0109288 | A1* | 5/2011 | Lee | H02M 3/156 323/282 |

(Continued)

OTHER PUBLICATIONS

F. Taeed and M. Nymand; A novel high performance and robust digital peak current mode controller for dc-dc converters in CCM; 2014 IEEE 15th Workshop on Control and Modeling for Power Electronics (COMPEL), pp. 1-5, Jun. 2014.

(Continued)

*Primary Examiner* — Alex Torres-Rivera
(74) *Attorney, Agent, or Firm* — Lempia Summerfield Katz LLC

(57) ABSTRACT

A device for power conversion includes an inductor, a switch having a switching cycle to control current flow through the inductor, a sensor coupled to the inductor to generate a signal representative of the current flow through the inductor, and a controller configured to generate a switch control signal for the switch to implement cycle-by-cycle control of the switching cycle for current-mode control of an output driven by the current flow through the inductor, the controller being coupled to the sensor such that the cycle-by-cycle control is based on the signal representative of the current flow through the inductor. The inductor is configured to exhibit a decrease in inductance with an increase in the current flow through the inductor.

24 Claims, 17 Drawing Sheets

(56) References Cited

U.S. PATENT DOCUMENTS

| | | | | |
|---|---|---|---|---|
| 2012/0038340 | A1* | 2/2012 | Shi | H02M 3/156 323/284 |
| 2012/0161740 | A1* | 6/2012 | Vogman | H02M 3/156 323/286 |
| 2014/0184180 | A1* | 7/2014 | Kronmueller | H02M 3/156 323/271 |
| 2014/0253061 | A1* | 9/2014 | Yang | H02M 3/158 323/271 |
| 2016/0294278 | A1* | 10/2016 | Li | H02M 3/156 |
| 2017/0098997 | A1* | 4/2017 | Hamada | H01F 1/0306 |
| 2017/0168146 | A1 | 6/2017 | Boehmke | |
| 2020/0036287 | A1* | 1/2020 | Peretz | H02M 3/157 |
| 2020/0064893 | A1* | 2/2020 | Kirchner | H02M 3/07 |
| 2020/0393543 | A1* | 12/2020 | David | H01S 5/0428 |

OTHER PUBLICATIONS

L. Corradini, E. Orietti, P. Mattavelli, and S. Saggini; Digital hysteretic voltage-mode control for dc-dc converters based on asynchronous sampling; IEEE Transactions on Power Electronics, vol. 24, pp. 201 211, Jan. 2009.

R. Redl and I. Novak; Instabilities in current-mode controlled switching voltage regulators, IEEE Power Electronics Specialists Conference, 1981, pp. 17-28.

S. Saggini, D. Trevisan, P. Mattavelli, and M. Ghioni; Synchronous—asynchronous digital voltage-mode control for dc-dc converters; IEEE Transactions on Power Electronics, vol. 22, pp. 1261-1268, 2007.

X. Cui and A. Avestruz; Switching-synchronized sampled-state space modeling and digital controller for a constant off-time, current-mode boost converter; 2019 American Control Conference (ACC); 2019; pp. 1-8.

A. Soto, A. de Castro, P. Alou, J. A. Cobos, J. Uceda, and A. Lotfi; Analysis of the buck converter for scaling the supply voltage of digital circuits; IEEE Transactions on Power Electronics, vol. 22, No. 6, pp. 2432-2443, 2007.

D. Maksimovic, A. M. Stankovic, V. J. Thottuvelil, and G. C. Verghese; Modeling and simulation of power electronic converters; Proceedings of the IEEE, vol. 89, pp. 898-912, 2001.

Frost and Sullivan; LiDAR: driving the future of autonomous navigation; 2016; 30 pp.

G. Di Capua and N. Femia; A novel method to predict the real operation of ferrite inductors with moderate saturation in switching power supply applications; IEEE Transactions on Power Electronics, vol. 31, Mar. 2016; 9 pp.

J. Chen, A. Prodic, R. W. Erickson, and D. Maksimovic; Predictive digital current programmed control; IEEE Transactions on Power Electronics, vol. 18, pp. 411-419, Jan. 2003.

J. M. Galvez, M. Ordonez, F. Luchino, and J. E. Quaicoe; Improvements in boundary control of boost converters using the natural switching surface; IEEE Transactions on Power Electronics, vol. 26; Nov. 2011; 8 pp.

M. Andersson and J. Kjornsberg; Design of Lidar-system; Department of Electrical and Information Technology, Lund University; 2014; 126 pp.

N. Bof, R. Carli, and L. Schenato; Lyapunov theory for discrete time systems; arXiv:1809.05289, Technical Report 2018; 35 pp.

O. Optoelectronics; Input light intensity; 2013; 1 pp; Available: http://www.osioptoelectronics.com/technology-corner/frequently-asked-questions/input-light-intensity.aspx.

O. optoelectronics; Photodiode characteristics and applications; 2006; 9 pp.

R. Bouyekhf, A. El Moudni, A. El Hami, N. Zerhouni, and M. Ferney; Reduced order modelling of two-time-scale discrete nonlinear systems; Journal of the Franklin Institute, vol. 333, No. 4, pp. 499-512, 1996.

R. P. Singh and A. M. Khambadkone; A buck-derived topology with improved step-down transient performance; IEEE Transactions on Power Electronics, vol. 23, pp. 2855-2866, Nov. 2008.

R. Priewasser, M. Agostinelli, C. Unterrieder, S. Marsili, and M. Huemer; Modeling, control, and implementation of dc-dc converters for variable frequency operation; IEEE Transactions on Power Electronics, vol. 29, pp. 287-301, 2014.

S. Bickman and D. DeMille; Large-area, low-noise, high-speed, photodiode-based fluorescence detectors with fast overdrive recovery; Review of scientific instruments, vol. 76, p. 113101, 2005; 8 pp.

S. C. Huerta, A. Soto, p. Alou, J. A. Oliver, O. Garca, and J. A. Cobos; Advanced control for very fast dc-dc converters based on hysteresis of the Cout current; IEEE Transactions on Circuits and Systems—I: Regular Papers, vol. 60, pp. 1052-1061, Apr. 2013.

S. M. Ahsanuzzaman, T. McRae, M. M. Peretz, and A. Prodic; Low volume buck converter with adaptive inductor core piasing; 2012 Twenty-Seventh Annual IEEE Applied Power Electronics Conference and Exposition (APEC), pp. 335-339, Feb. 2012.

T. D. Burd, T. A. Pering, A. J. Stratakos, and R. W. Brodersen; A dynamic voltage scaled microprocessor system; IEEE Journal of Solid-State Circuits, vol. 35, pp. 1571-1580, Nov. 2000.

T. S. Li, J. S. Chiou, and F. C. Kung; Stability bounds of singularly perturbed discrete systems; IEEE Transactions on Automatic Control, vol. 44, pp. 1934-1938, Oct. 1999.

Texas Instruments; Nanosecond Laser Driver Reference Design for LiDAR; 2018; 21 pp.

Velodyne; High resolution real-time 3D LiDAR sensor; Available: https://velodynelidar.com/hdl-32e.html; 2020; 4 pp.

Velodyne; Velodyne's HDL-64E: a high definition LiDAR sensor for 3-D applications; 2007; 7 pp.

Verena Mackowiak, Jens Peupelmann, Yi Ma, and Anthony Gorges; NEP—Noise Equivalent Power; Thorlabs, Inc.; 2015; 5 pp.

W. Lu, W. Chen, Y. Ruan, and H. H. Iu; An auxiliary-parallel-inductor based sequence switching control to improve the load transient response of buck converters; IEEE Transactions on Industrial Electronics, vol. 66, pp. 2776-2784, Apr. 2019.

X. Cui and A. Avestruz; A new framework for cycle-by-cycle digital control of megahertz-range variable frequency buck converters; IEEE 19th Workshop on Control and Modeling for Power Electronics (COMPEL), 2018, pp. 1-8.

Z. Shen, N. Yan, and H. Min; A multimode digitally controlled boost converter with PID autotuning and constant frequency/constant off-time hybrid PWM control; IEEE Transactions on Power Electronics, vol. 26, pp. 2588-2598; 2011.

* cited by examiner

CYCLE-BY-CYCLE DIGITAL CONTROL OF DC-DC CONVERTERS

CROSS-REFERENCE TO RELATED APPLICATION

This application claims the benefit of U.S. provisional application entitled "Cycle-By-Cycle Digital Control of DC-DC Converters," filed Jun. 15, 2020, and assigned Ser. No. 63/039,230, the entire disclosure of which is hereby expressly incorporated by reference.

STATEMENT REGARDING FEDERALLY SPONSORED RESEARCH OR DEVELOPMENT

This invention was made with government support under DE-EE-0007549 awarded by the Department of Energy. The government has certain rights in the invention.

BACKGROUND OF THE DISCLOSURE

Field of the Disclosure

The disclosure relates generally to power converters and automatic power control for systems, such as solar photovoltaic energy conversion and light detection and ranging (LiDAR) systems.

Brief Description of Related Technology

High-performance dc-dc converters for dynamic voltage scaling (DVS), including voltage regulator modules (VRMs) provide fast transient response, often smaller than 5 s. However, the large-signal response of a traditional buck converter is fundamentally limited by inductor current slew rate. The theoretical maximum current slew rate is inversely proportional to the inductance.

Significant progress had been achieved in improving transient response. Additional power electronics have been used to extend improvements. Traditional fixed-frequency peak (or valley) current-mode control typically results in a slower large-signal transient response. Current-programmed control, which uses an estimate of the inductor current, often becomes unstable when the inductor deeply saturates. The performance of sliding mode controllers, along with other time-optimal controllers, significantly degrades as well.

An auxiliary inductor has been connected in parallel with a main inductor to decrease the equivalent inductance in the transient. One disadvantage of this method is the mode-switching causes a sudden interruption of inductor current without any freewheeling action. Extra hardware is often used to address such a high di/dt. An auxiliary switch has been used to increase the voltage across the inductor. However, this method cannot improve the maximum rising current slew rate, and its improvement on falling slew rate is limited to applications where the output voltage is greater than half the input voltage ($V_{out} > 0.5\ V_{in}$).

A saturating inductor has been used to improve transient response. Please see, e.g., Ahsanuzzamamn et al., Low-volume buck converter with adaptive inductor core biasing," IEEE Applied Power Electronics Conference and Exposition (APEC), pp. 335-339 (2012). But fixed-frequency peak current-mode control may not always work with a saturating inductor. For example, the inner current loop will be unstable when the duty-cycle D is greater than 0.5. Slope compensation for stability will likely not have deadbeat current dynamics during large-signal transients, i.e., the inductor current does not reach the correct peak value at every switching interval, resulting in slower rise times.

SUMMARY OF THE DISCLOSURE

In accordance with one aspect of the disclosure, a device for power conversion includes an inductor, a switch having a switching cycle to control current flow through the inductor, a sensor coupled to the inductor to generate a signal representative of the current flow through the inductor, and a controller configured to generate a switch control signal for the switch to implement cycle-by-cycle control of the switching cycle for current-mode control of an output driven by the current flow through the inductor, the controller being coupled to the sensor such that the cycle-by-cycle control is based on the signal representative of the current flow through the inductor. The inductor is configured to exhibit a decrease in inductance with an increase in the current flow through the inductor.

In accordance with another aspect of the disclosure, a light detection and ranging (LiDAR) system includes a laser pulse driver and a power converter coupled to the laser pulse driver to provide dynamic voltage scaling for the laser pulse driver. The power converter includes an inductor, a switch having a switching cycle to control current flow through the inductor, a sensor coupled to the inductor to generate a signal representative of the current flow through the inductor, and a controller configured to generate a switch control signal for the switch to implement cycle-by-cycle control of the switching cycle for current-mode control of an output voltage driven by the current flow through the inductor, the controller being coupled to the sensor such that the cycle-by-cycle control is based on the signal representative of the current flow through the inductor.

In connection with any one of the aforementioned aspects, the devices, systems, and/or methods described herein may alternatively or additionally include or involve any combination of one or more of the following aspects or features. The power conversion is dynamic voltage scaling. The power conversion is a regulated output responding to a fast load change. The switching cycle is variable frequency. The switching cycle is fixed frequency in the steady state. The output is a voltage. The output is a current. An output ripple of the output does not contain subharmonics. The inductor is configured to exhibit a hard saturation upon the increase in the current flow through the inductor. The inductor is configured to operate in saturation during a step-up transient in a desired voltage level for the output voltage. The inductor is configured as a composite inductor. The inductor includes a plurality of inductances, each inductance of the plurality of inductances being configured to saturate at a different current level. The controller implements event-driven sampling. The controller is triggered by detection of the current flow passing a valley current level. The controller is triggered by detection of the current flow passing a peak current level. The controller is configured to implement a control scheme for a buck converter operating in constant on-time mode. The controller is configured to implement a control scheme for a boost converter operating in constant off-time mode. The device further includes a comparator that couples the sensor to the controller to compare the signal representative of the current flow through the inductor with a desired current level generated by the controller. The device further includes a laser pulse driver coupled to the inductor to receive the output voltage driven by the current flow through the inductor. The switching cycle is variable frequency. The switching cycle is fixed frequency in the steady state. The controller implements event-driven sampling. The controller is triggered by detection of the current flow passing a peak current level. The controller is triggered by detection of the current flow passing a valley current level. The controller is configured to implement a control scheme for a boost converter operating in constant off-time mode. The LiDAR system further includes a comparator that couples the sensor to the controller to compare the signal representative of the current flow through the inductor with a desired current level generated by the controller. The inductor is configured to exhibit a decrease in inductance with an increase in the current flow through the inductor. The inductor is configured to operate in saturation during a step-up transient in a desired voltage level for the output voltage. The inductor is configured as a composite inductor. The inductor includes a plurality of inductances, each inductance of the plurality of inductances being configured to saturate at a different current level.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
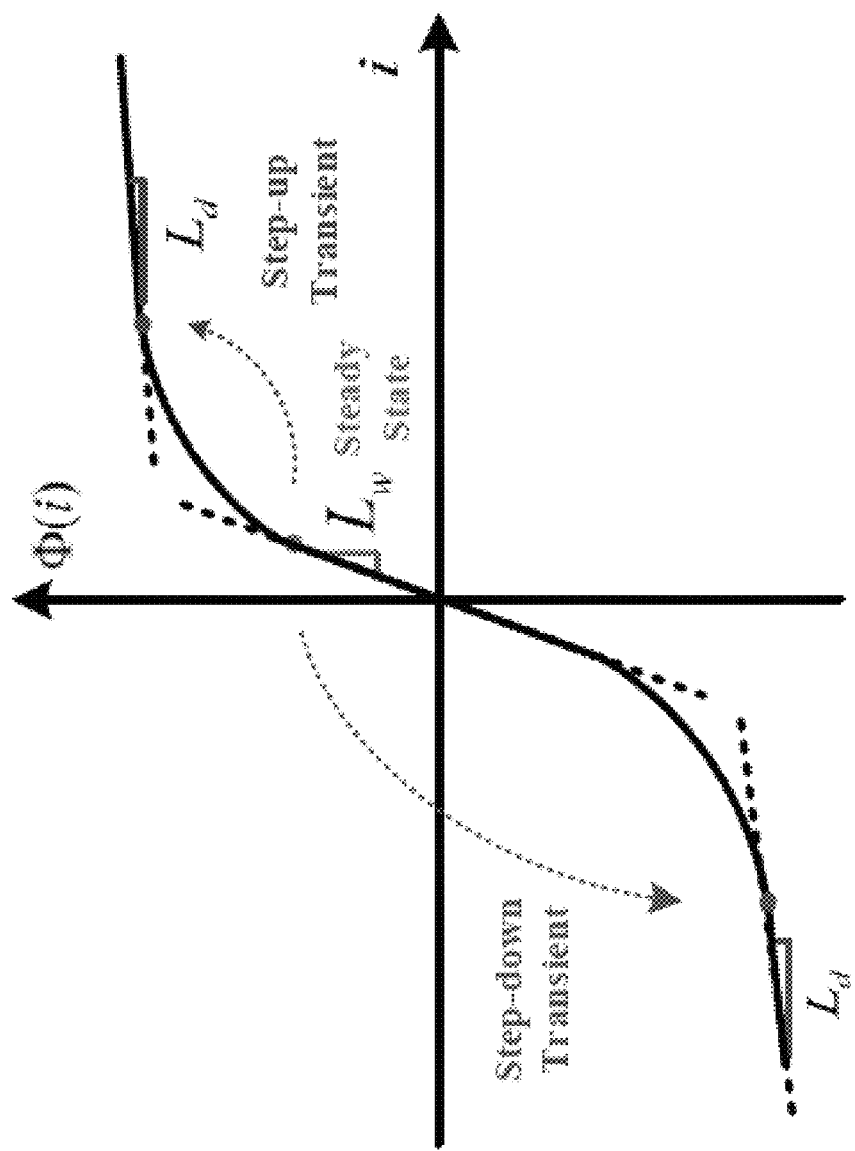
FIG. 1 is a graphical plot of magnetic flux versus current depicting saturation-induced variation in inductance during step-up and step-down voltage transients in accordance with one example.

The embodiments of the disclosed devices and systems may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Devices and systems with cycle-by-cycle digital control of DC-DC converters are described. Methods for such digital control are also described. The disclosed devices, systems, and methods may employ a saturating inductor with a systematic control design to increase the slew rate and improve transient response of variable frequency power converters. For instance, described below is an example of a stable controller capable of supporting a 2.6 μs no-overshoot, large-signal transient response with a peak slew current that is 11 times the steady-state average current. These and other aspects of the disclosed devices, systems, and methods may be achieved via only a small hardware modification, rather than rely on, for instance, extensive additional power electronics. For instance, use of a saturating inductor may avoid reliance on additional complicated hardware to attempt to increase the slew rate.

Cycle-by-cycle digital control can achieve a fast transient response without high speed sampling hardware through event-triggered control and non-uniform sampling techniques. Moreover, the control process is purely digital and highly accurate. Previously, this technique was only applied to the case where the input-to-output difference equation of the plant is linear. For instance, a switching-synchronized sampled-state space (5S) framework has been used to control a buck converter. For instance, in the 5S framework, minimizing the number of settling switching cycles in the 5S frame is equivalent to minimizing the physical time settling. For instance, in the 5S framework, bounding the peak overshoot in the 5S frame is equivalent to bounding the peak overshoot in the physical time frame. Please see, e.g., Cui et al., "A new framework for cycle-by-cycle digital control of megahertz-range variable frequency buck converters," IEEE 19th Workshop on Control and Modeling for Power Electronics (COMPEL), pp. 1-8 (2018), the entire disclosure of which is hereby incorporated by reference.

The disclosed devices, systems, and methods may employ a controller where the output current ripple or voltage ripple of the power converter does not contain subharmonics. Stability without subharmonics is described in Cui et al., "A new framework for cycle-by-cycle digital control of megahertz-range variable frequency buck converters," IEEE 19th Workshop on Control and Modeling for Power Electronics (COMPEL), pp. 1-8 (2018), the entire disclosure of which is hereby incorporated by reference.

As described herein, the switching-synchronized sampled-state space framework is used to control a converter (e.g., a buck or boost converter) that uses a saturating inductor. Other, current-programmed controllers are likely to incorrectly predict inductor current and go into instability because of the nonlinear and cycle-varying current slope. Sliding mode controllers and other time-optimal controllers require a-priori inductor information to schedule the optimal trajectory; therefore, their performance largely degrades because of widely varying uncertainties in a saturating inductor.

However, the saturating inductor dc-dc converters described herein work under a large-signal output voltage variation and deep inductor current saturation. The inductor current is not a ramp with cycle-invariant slope, but rather a nonlinear curve with a cycle-varying shape. Hence, severe nonlinearities show up in the plant input-to-output difference equation. The cycle-by-cycle control may nonetheless be extended to this non-linear plant as described herein.

Although described in connection with buck converters, the disclosed devices, systems, and methods may include, incorporate, or otherwise involve other converter architectures or types. For example, boost converters may be provided or involved.

Although described in connection with LiDAR examples, the disclosed devices, systems, and methods may be useful in connection with a wide variety of other applications, including, for instance, solar photovoltaics, DC micro-grids, electric vehicles, and data center power distribution. The following operational characteristics of the disclosed devices, systems, and methods are useful in the following and other ways: (1) fast response operation (e.g., high control bandwidth, high switching frequency); (2) flexible operation (e.g., useful current sharing and/or power management capability); (3) reliable operation (e.g., input disturbance rejection capability and stability robustness to interference and load disturbance, and (4) safety (e.g., cycle-by-cycle fast overcurrent protection). This is in contrast to other power converters that are vulnerable to interference, which leads to slow performance (e.g., limited control bandwidth), inflexibility (e.g., unstable current/voltage, loss of power management), unreliability (e.g., instability, manifested as subharmonics, that degrades input rejection capability), and unsafe operation (e.g., failure due to overcurrent/overvoltage).

The disclosed devices, systems, and methods may use a hard-saturating inductor where the permeability (slope magnetic field vs. ampere-turns) of the core decreases quickly with current, rather than a soft-saturating inductor where the permeability (slope magnetic field vs. ampere-turns) decreases slowly with current, to improve the transient response of the converters described herein. For instance, a hard-saturating inductor has a knee or bend in the inductance characteristic, as opposed to a linear or other gradual change in inductance over a range of operational current levels.

As shown in FIG. 1, in the steady state, the inductor stays in its weak-saturation region with inductance $L_w$, which is selected based on the converter current ripple rate specification. During a step-up transient, the inductor reaches the deep-saturation region and its inductance drops dramatically to $L_d$. Therefore, the rising current slew rate largely increases and the output capacitor is charged by the large transient current at high speed. The deep-saturation inductance together with the circuit parasitic inductance automatically limits the maximum current and protects the switches. The current magnetic flux relationship $\Psi(I)$ of the inductor L may be a single-valued function because inductors for high frequency power converters typically have negligible hysteresis.

Figure 2:
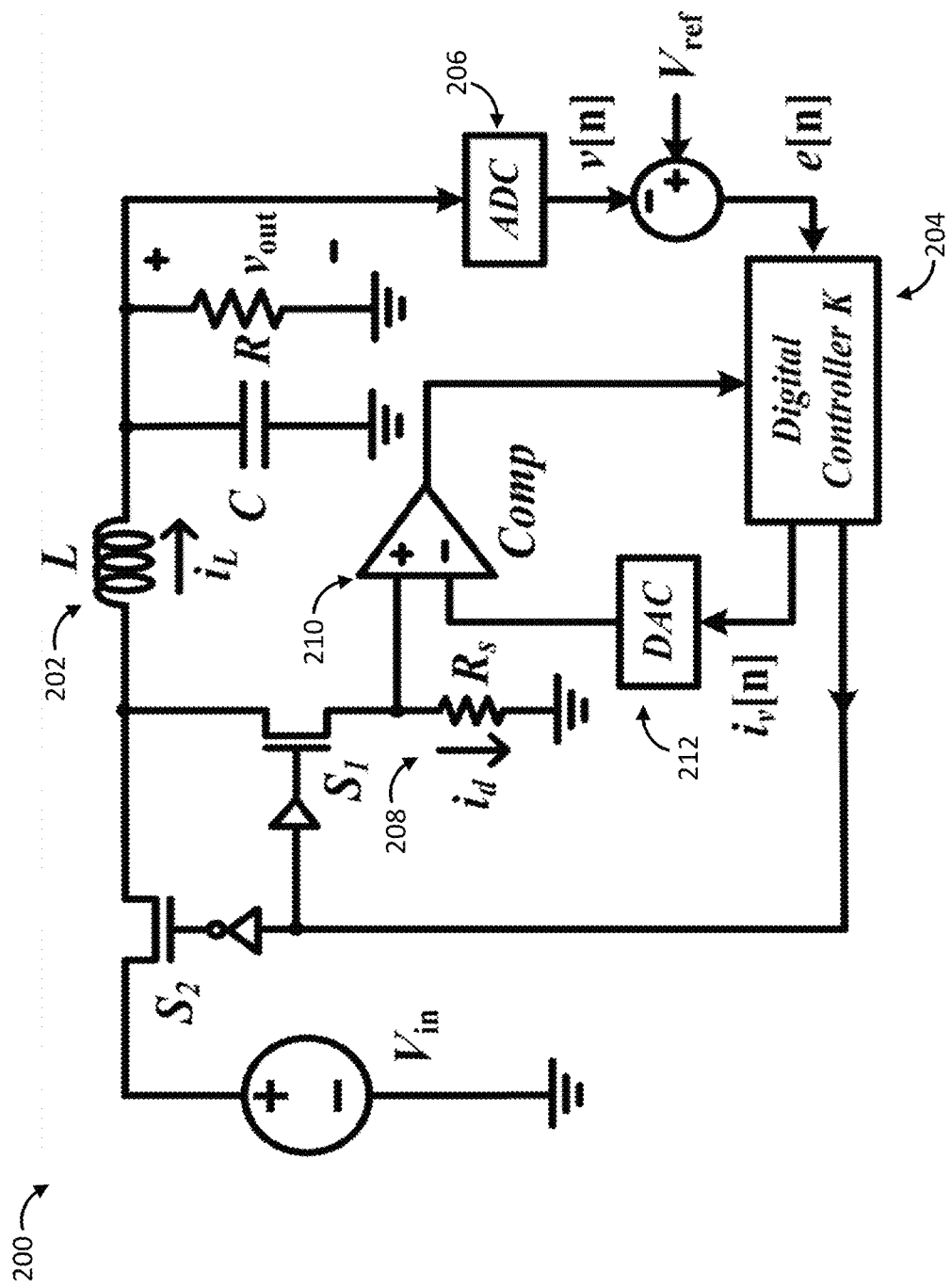
FIG. 2 is a schematic view of a current-mode, constant on-time buck converter having a saturating inductor and cycle-by-cycle digital control in accordance with one example.

FIG. 2 depicts a current-mode buck converter 200 configured for constant on-time operation (i.e., a CM-COT buck converter) with a saturating inductor 202 in accordance with one example. The buck converter 200 includes a digital controller 204. In this example, the digital controller 204 is configured as a non-linear, time-varying controller that implements event-driven sampling and control. The disclosed devices, systems, and methods may thus implement variable frequency current-mode control.

The operating frequency of a variable frequency power converter may be enforced to return to a specified steady-state frequency after period of time. For instance in FIG. 2, a feedback loop may be used to control the on-time of the converter 200 to change the operating frequency. In this instance, the current control loop for the valley current will change the off-time and the frequency controller will control the on-time. This frequency controller may be closed loop. An example of a closed-loop frequency controller is a phase lock loop.

The buck converter 200 of FIG. 2 and other converters, devices, systems, and methods described herein may be configured to provide voltage scaling or otherwise regulate the output voltage, for instance, to meet loads with a fluctuating power demand. The current to supply the load and, thus, the voltage scaling, is provided via variable frequency switching of one or more switches. In the example of FIG. 2, the buck converter 200 includes two complementary switches $S_1$ and $S_2$. With the buck converter 200, the length of time that the switch $S_1$ is activated (ON) stays constant. The duty cycle of the switch $S_1$ effectively determines the output voltage $V_{out}$ of the buck converter 200, as described below.

The buck converter 200 of FIG. 2 and other converters, devices, systems, and methods described herein may be configured to provide a current output. In one instance, the current output may be regulated to meet loads with a fluctuating power demand. In another instance, the buck converter 200 of FIG. 2 and other converters, devices, systems, and methods described herein may be configured to provide current scaling to, for instance, meet loads with a fluctuating current demand.

Figure 3:
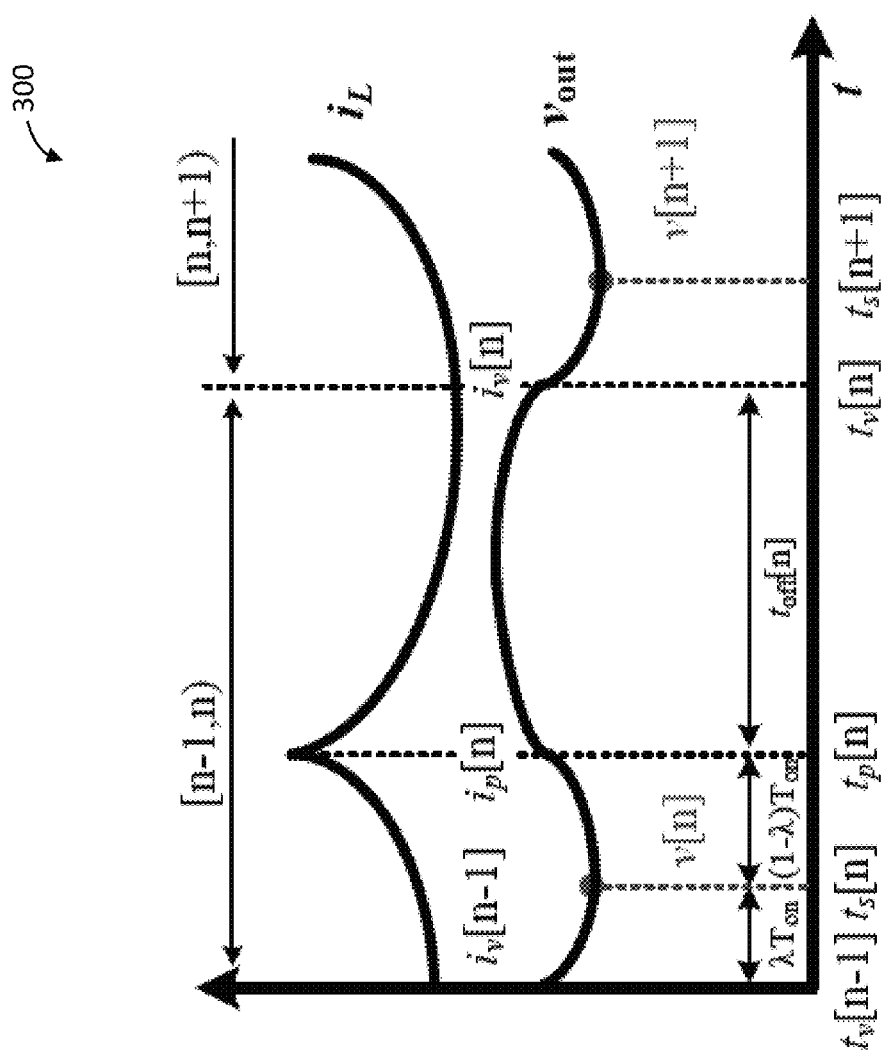
FIG. 3 is a graphical plot of inductor current and capacitor voltage waveforms in a current-mode, constant on-time buck converter having a saturating inductor and cycle-by-cycle digital control in accordance with one example.

The output voltage $V_{out}$ of the buck converter 200 may be controlled indirectly by controlling the current $i_L$ through the inductor 202 (L). The inductor current may be controlled by measuring the output voltage and, for each cycle (e.g., switching cycle) determining what the valley of the inductor current (see, e.g., FIG. 3) should be based on the output voltage. Determining the valley of the inductor current effectively controls the average inductor current. If the output voltage is too low, the control scheme effectively increases the inductor current. If the output voltage is too high, the control scheme effectively decreases the inductor current.

The digital controller 204 of the buck converter 200 may include a series of non-periodic sampling and control actions, triggered by events rather than, for instance, a clock. Each switching cycle may include one sampling event and one control action. For example, the event may correspond with a first instance that a current measurement crosses a threshold. Because the switching intervals are varying, the sampling and control event intervals are also time varying. The sampling, control events, and switching events may nonetheless be synchronized.

The manner in which the valley current level of the buck converter 200 of FIG. 2 is determined in accordance with one example is now described. A sensor 206 senses the output voltage at every voltage sampling point. In this example, the sensor 206 is or includes an analog-to-digital converter. In some cases, the voltage may be sampled in a fixed ratio time point during constant on time.

The buck converter 200 includes a sensor 208 coupled to the inductor 202 to generate a signal representative of the current flow through the inductor 202. In the example of FIG. 2, the sensor 208 is or otherwise includes a current sense resistor $R_s$ coupled to the inductor 202 via the switch $S_1$. The inductor current is measured by the sensor 208 when the up switch (i.e., the switch $S_2$) is off and the down switch is on (i.e. switch S1). The resistor $R_s$ converts the inductor current to a current sense resistor voltage.

The buck converter 200 includes a valley current controller. In the example of FIG. 2, the valley current controller is or includes a comparator 210 and a digital-to-analog converter (DAC) 212. The valley current command is provided by the DAC 212 to the comparator 210. The comparator 210 compares the DAC output and current sense resistor voltage. The output determination is provided to the digital controller 204 to generate a switch control signal (e.g., a gate signal) to turn off/on the switches. The valley current level can thus be established.

The converter 200 may include one or more processors to implement the cycle-by-cycle control scheme. In the example of FIG. 2, the digital controller 204 provides the processor(s). In some cases, the digital controller 204 is or includes a field programmable gate array (FPGA). Additional or alternative controllers or processors may be used, including, for instance, a microcontroller.

The cycle-by-cycle control scheme may include the following features. Sampling and control are driven by event rather than by time. The events may include switch activation (ON) events and/or switch deactivation (OFF) events. In this case, a switch-on event is triggered by valley current detection. A switch off event is triggered by a timer running out. In other cases, such as a boost converter, a switch-on event may be triggered by a peak current detection.

The inductance L of the inductor 202 affects how quickly an increase (or decrease) in the current can be achieved. The inductor 202 is configured to operate in saturation (e.g., a saturating inductor) such that the inductance is lower as the current level increases. In this way, if the control scheme suddenly demands more current out of the inductor 202 to replenish the output voltage, the inductor 202 can provide the current increase more quickly. As shown in a plot 300 of current in FIG. 3, the current does not increase linearly, but rather the slope may become steeper and steeper due to the decreasing inductance.

The manner in which the inductor 202 is configured to provide such saturation (e.g., hard saturation) may vary. For instance, the inductor 202 may be configured as a hard saturating inductor via properties or characteristics of a core (e.g., core geometry, material(s)), and/or the number of turns. Alternatively or additionally, the inductor 202 is configured as a composite inductor. The inductor 202 may thus include multiple inductors or other inductances arranged in series or parallel. The multiple inductors or inductances may be configured to saturate at different levels of current.

The composite inductor may include a plurality of windings on a common core or core material. In one instance, one winding may have a dc current that creates flux in the same direction as the current $i_L$ in FIG. 2, in which case the inductor will saturate at a lower $i_L$ current level. In another instance, one winding may have a dc current that creates flux in the opposite direction as the current $i_L$ in FIG. 2, in which case the inductor will saturate at a higher $i_L$ current level.

Alternatively or additionally, a permanent magnet may be used to create the flux that is in the same direction as the flux from the current $i_L$ to saturate the inductor at a lower value of $i_L$ or to create a flux in the opposite direction of the current $i_L$ to saturate the inductor at higher value of $i_L$.

In the example of FIG. 2, the plant is a buck converter operating in constant on-time mode. In other cases, the disclosed devices and systems may be configured as or otherwise include a boost converter operating in constant off-time mode.

The configuration of the buck (and other) converters may vary from the examples described herein. For instance, the disclosed devices and systems may be configured as or otherwise include converters having, for example, one or more of the following properties: (i) a constant on-time $T_{on}$ of the switch $S_1$; (ii) an off-time $t_{off}[n]$ of the switch $S_1$ determined by valley-current (the minimum inductor current every switching cycle); (iii) a saturating inductor L with a monotonically increasing and convex current-magnetic flux relationship; (iv) a saturating inductor with a weak-saturation region inductance $L_w$ and a deep-saturation region inductance $L_d$ a shown in FIG. 1; (v) any switching period $T_s[n]=T_{on}+t_{off}[n]$ is much smaller than the time constant RC (see, e.g., FIG. 2); (vi) any switching period $T_s[n]$ is much smaller than $(LC)^{1/2}$ (see, e.g., FIG. 2); and (vii) a constant input voltage $V_{in}$. The disclosed devices and systems may have additional, fewer, or alternative properties.

Figure 5:
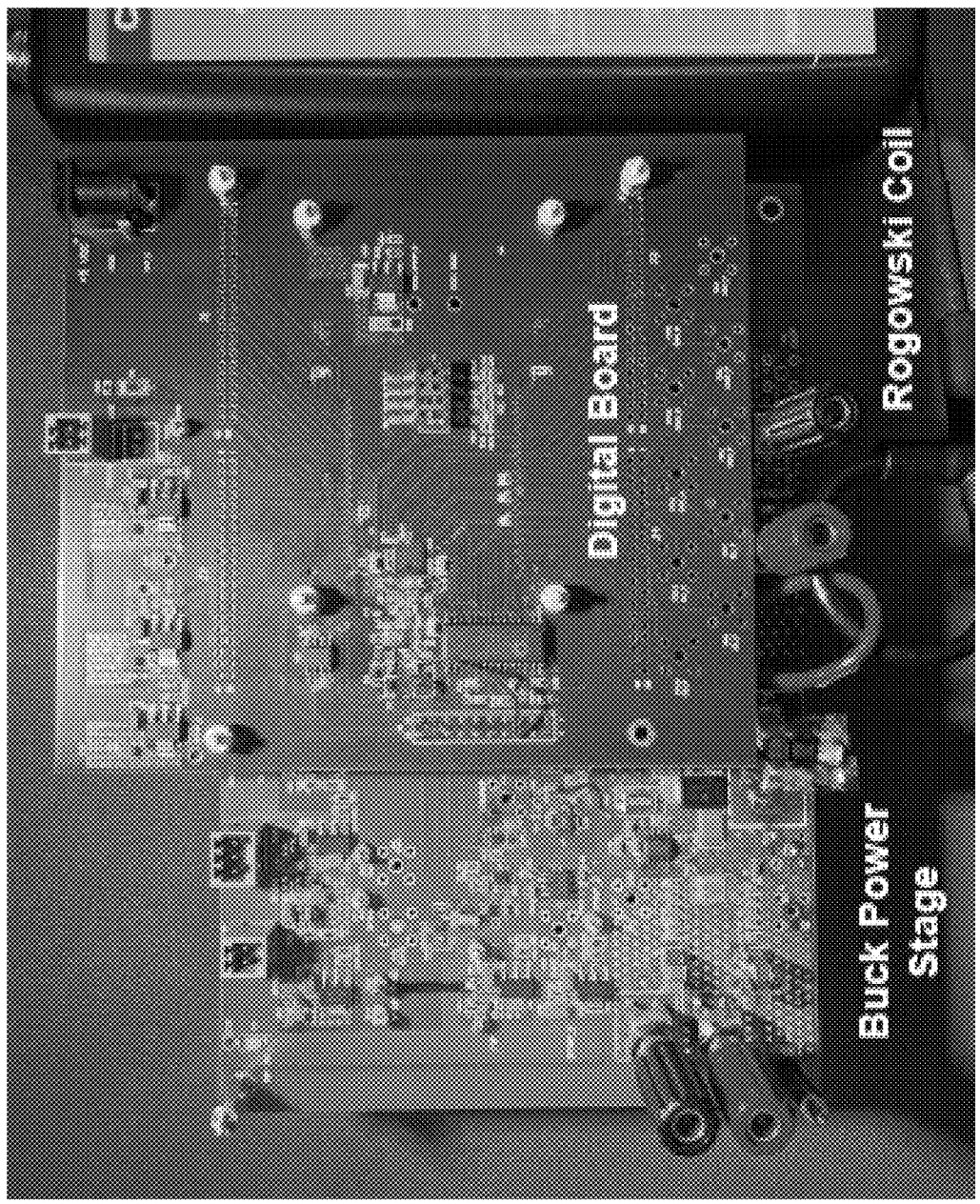
FIG. 5 is a plan view of a current-mode, constant on-time buck converter having a saturating inductor and cycle-by-cycle digital control in accordance with one example.

FIG. 5 depicts an example of a current-mode, constant on-time buck converter 500 constructed with the parameters in Table I below. The buck converter 500 was controlled cycle-by-cycle digitally by an Artix-7 FPGA from Xilinx. In this example, a proportional gain block was added in parallel with the switching synchronized integral control framework described herein to improve the transient response.

TABLE I

| BUCK CONVERTER DESIGN PARAMETERS | | |
|---|---|---|
| Test case | 1 | 2 |
| $f_{pk}$ [MHz] | 5 | 3 |
| $f_{ss}$ [MHz] | 4 | 1 |
| $V_{in}$ [V] | 12 | 12 |
| $V_{out}$ [V] | 2.5 | 1.8 |
| On-Time [ns] | 2.5 | 1.8 |
| Power [W] | 30 | 16 |
| $L_w$ [nH] | 190 | 290 |
| $L_d$ [nH] | 90 | 90 |
| C [µF] | 200 | 200 |
| ADC | LTC2378-16 | |
| DAC | AD9744 | |
| MOSFET | IRF6620 | |

A Rogowski coil (Model: CWT MiniHF 30) was used to measure the large inductor current during the transient (>11 times the steady-state dc current). The dc current of the inductor in the steady state is 5 A, which cannot be shown in FIGS. 4, 6 and 7 because dc is below the −3 dB lower cutoff frequency of the coil (1.5 Hz).

Figure 4:
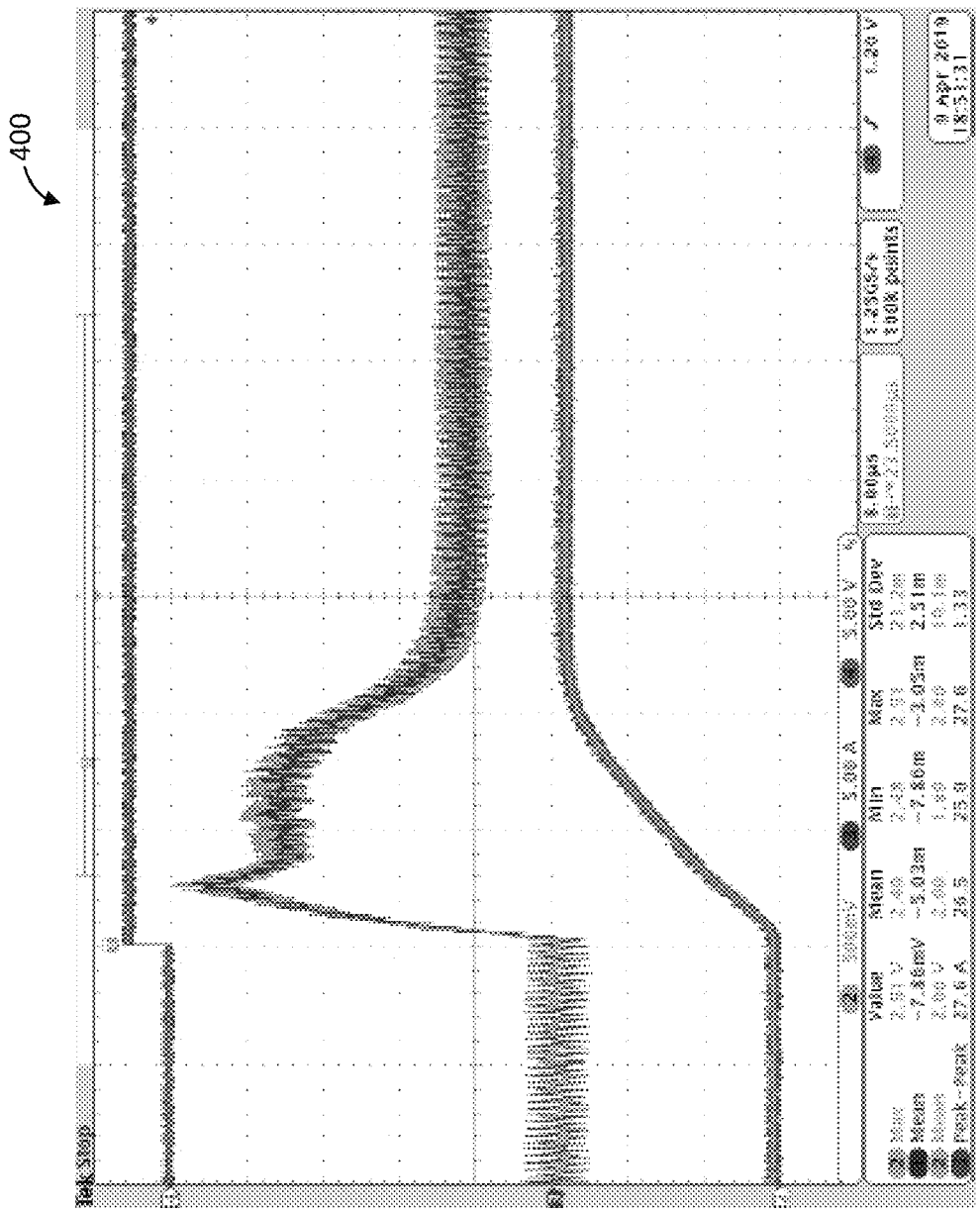
FIG. 4 is a graphical plot of voltage waveforms in a current-mode, constant on-time buck converter having a saturating inductor and cycle-by-cycle digital control in accordance with one example.

FIG. 4 shows a signal waveform plot 400 that includes a large-signal 1V to 2.5V output voltage step of the saturating inductor converter operating in Test Case 1 (Table 1). The converter demonstrates large-signal stability with 5 MHz peak switching frequency.

Figure 6:
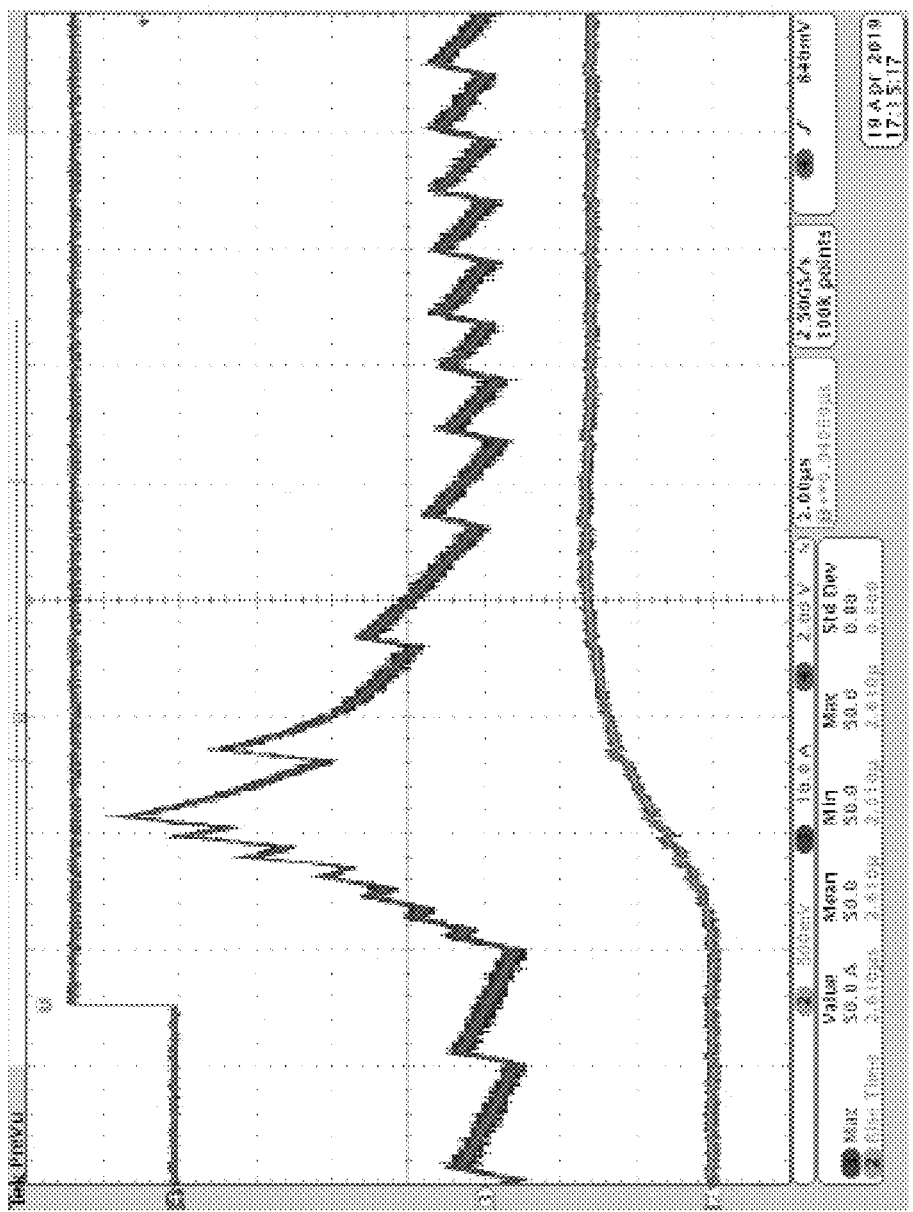
FIG. 6 is a graphical plot of voltage waveforms of a large-signal output voltage step response of the current-mode, constant on-time buck converter of FIG. 5.

FIG. 6 shows a large-signal 1V to 1.8V output voltage step of the saturating inductor converter operating in Test Case 2 (Table 1). The converter demonstrates large-signal stability with 3 MHz peak switching frequency and a rise time of 2.610 µs. The peak inductor current reaches 55 A during which the inductance drops by 47% (deep saturation).

Figure 7:
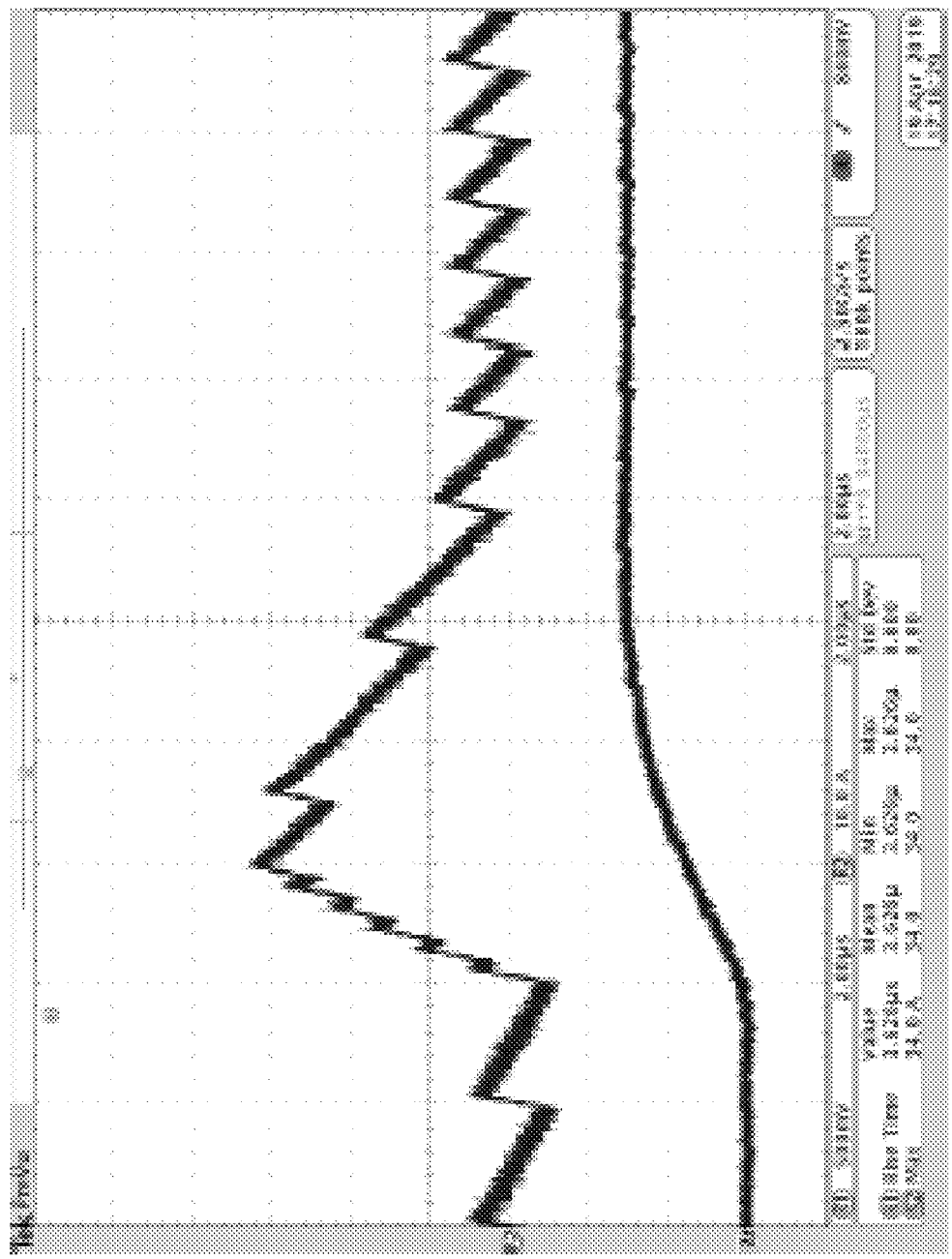
FIG. 7 is a graphical plot of voltage waveforms of a large-signal output voltage step response of a buck converter with a non-saturating inductor.

In contrast, a converter with a non-saturating inductor had a rise time of 3.626 µs and a peak inductor current 39A under the same output voltage overshoot condition, as shown in FIG. 7. This results in a transient response time improvement of about 30% by using the saturating inductor. A better response can be achieved by an alternative configuration (e.g., a PC board layout) that presents a smaller parasitic inductance.

The above-described testing demonstrated that the use of a saturating inductor can improve the transient response of a 5 MHz buck converter using cycle-by-cycle digital control. A large-signal rise time of 2.6 µs was attained without voltage overshoot.

Described above are dc-dc converters with faster transient response times for improved performance in dynamic voltage scaling (DVS) applications. The inductor current slew rate is addressed by employing a saturating inductor. A systematic control design is used to increase the slew rate without introducing extra hardware. The resulting saturating inductor current-mode buck converter using constant-on-time (CM-COT buck converter) is controlled by a high-speed cycle-by-cycle digital controller that implements a switching-synchronized sampled-state space (5S) control framework.

Described below are examples of cycle-by-cycle digital control of other variable frequency converters, such as a multi-megahertz variable frequency boost converter for automatic power control in a Light Detection and Ranging (LiDAR) system. In this application, dynamic voltage scaling is used to support efficient operation despite rapidly fluctuating power demand, which is exemplified in the automatic power control of LiDAR, e.g., for autonomous ground and airborne vehicles. This is challenging in boost converters because of more complicated dynamics. A current-mode boost converter using constant-off-time (variable-frequency) is useful in this context because inductor current settles in one switching cycle. Digital control is used for programmable flexibility over a wide operating range. However, variable frequency power conversion and high speed digital control are challenging to combine in a traditional digital control framework. Cycle-by-cycle digital control of a variable frequency power converter is used to realize an example of a variable-frequency boost converter with a 3 MHz peak switching frequency and a fast dynamic response over a wide operating range.

Any one or more of the aspects of the LiDAR systems described herein may be incorporated into any of the devices and systems described above, and vice versa. For instance, the saturating inductor of the above-described devices and systems may be integrated into the converters of the LiDAR systems.

Figure 8:
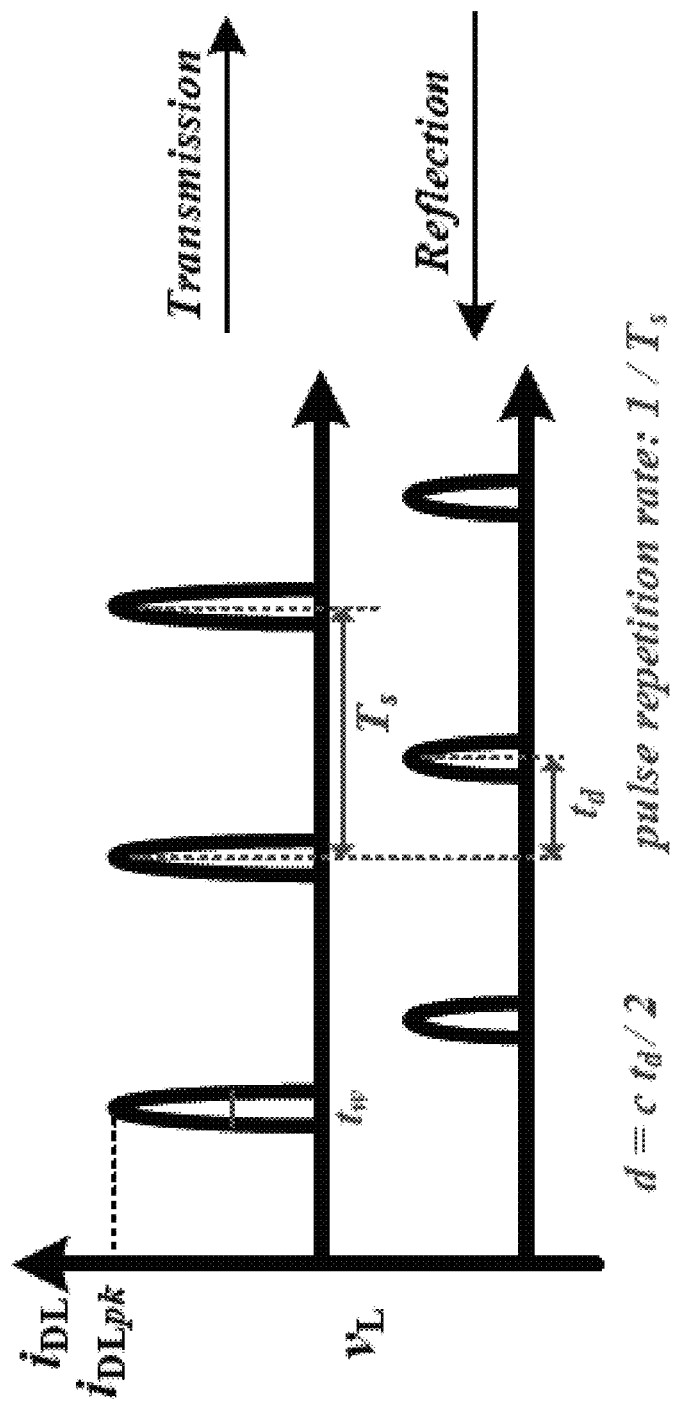
FIG. 8 is a graphical plot of current and voltage waveforms of a LiDAR transceiver in accordance with one example.

A LiDAR sensor, or system, is often used as the "eyes" of autonomous ground and airborne vehicles because of its high accuracy in long-range detection and low sensitivity to ambient interference. As shown in the example of FIG. 8, a laser driver transmits a forward laser sequence with a pulsed optical intensity because large peak intensity enables long-distance detection and low average signal energy guarantees eye safety. By measuring the total time $t_d$ for the laser to travel forward and backward, the LiDAR system can calculate the distance d between the sensor and the obstacle.

Figure 10:
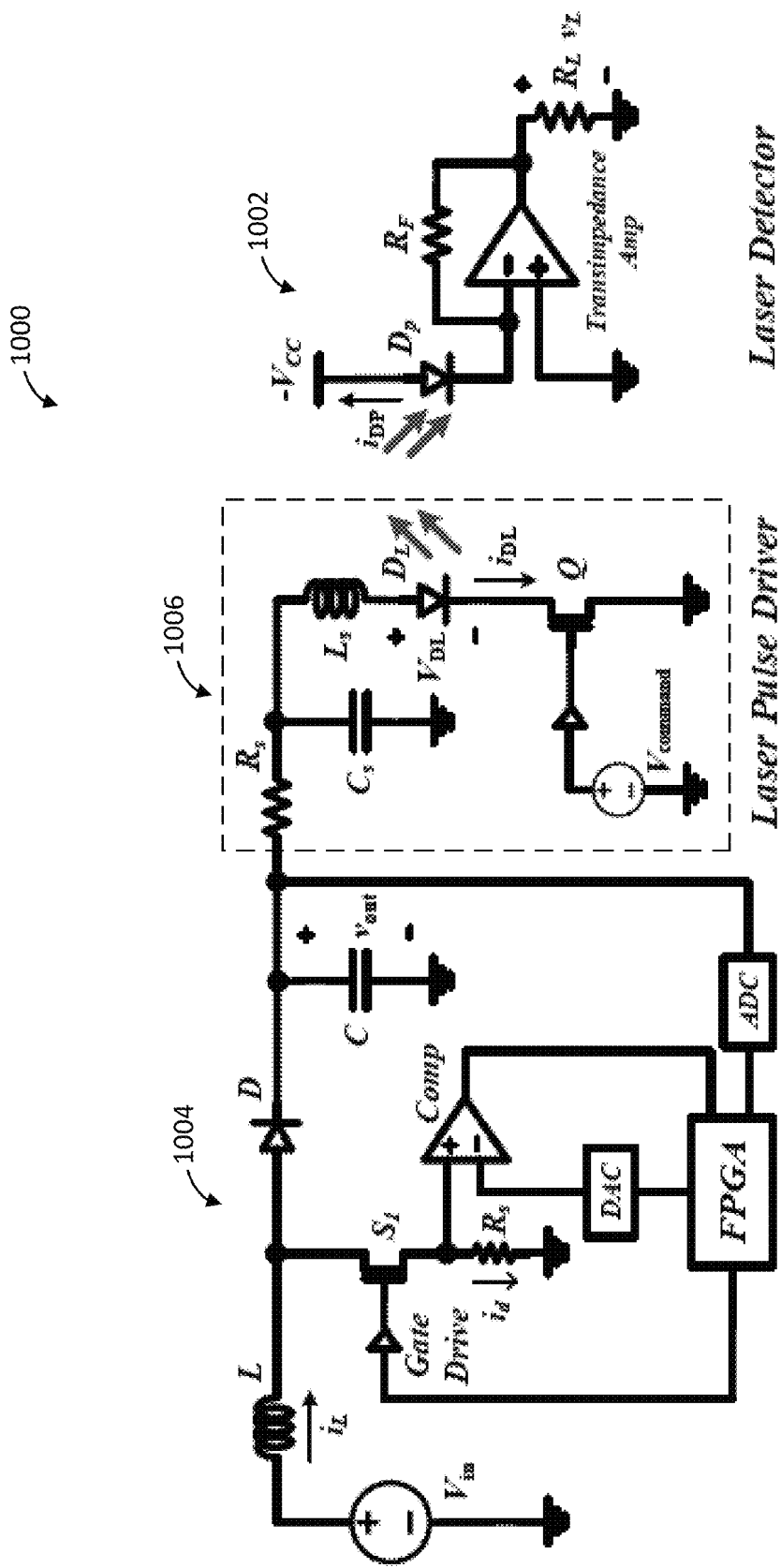
FIG. 10 is a schematic view of a constant off-time, current-mode boost converter power supply and LiDAR transceiver system in accordance with one example.

Automatic power control of LiDAR dynamically adjusts the power consumption of laser transmitters to improve the LiDAR sensor's detection accuracy and thermal management. FIG. 10 depicts one example of a LiDAR transceiver system 1000. If the reflected signal power is near the saturation of an optical detector 1002, the peak intensity of the forward laser sequence is reduced to eliminate resulting measurement errors as well as thermal damage to the photodiode. Alternatively, if the reflected signal power is near the noise equivalent power of the detector 1002, the peak of the next forward laser pulse is increased to prevent overlooking obstacles.

The LiDAR system 1000 includes a boost converter 1004 to provide a high voltage to a LiDAR transmitter 1006. A high-performance boost LiDAR power supply uses a large control bandwidth to adjust the voltage level, e.g., within 10 µs, over a wide output voltage range and a good load disturbance rejection ability to handle the instantaneous power consumption demand. The dynamics of power converters vary with operating point. Real-time tuning may be realized on a digital controller to ensure consistently good dynamic performance, in contrast to a single analog compensation network.

A constant off-time current-mode (COT-CM) boost converter is useful for the automatic power control of LiDAR systems for several reasons. First, a current-mode boost converter is faster and more easily compensated than a voltage-mode converter because of the resulting first-order system. Second, constant off-time operation for peak current-mode in a boost converter does not involve the additional complication of slope compensation while ensuring single-cycle settling for all operating points. Moreover, the peak-current-mode control strategy may be applied to both CCM (continuous-conduction-mode) and DCM (discontinuous-conduction-mode). Third, a constant off-time boost converter may be configured to avoid the limit-cycle-oscillation (LCO) at high duty ratios, which is better than constant-frequency and constant on-time operation. Fourth, because there is a non-minimum-phase zero in the boost plant model, hysteretic or sliding mode controllers are much more difficult to design and implement.

Figure 9:
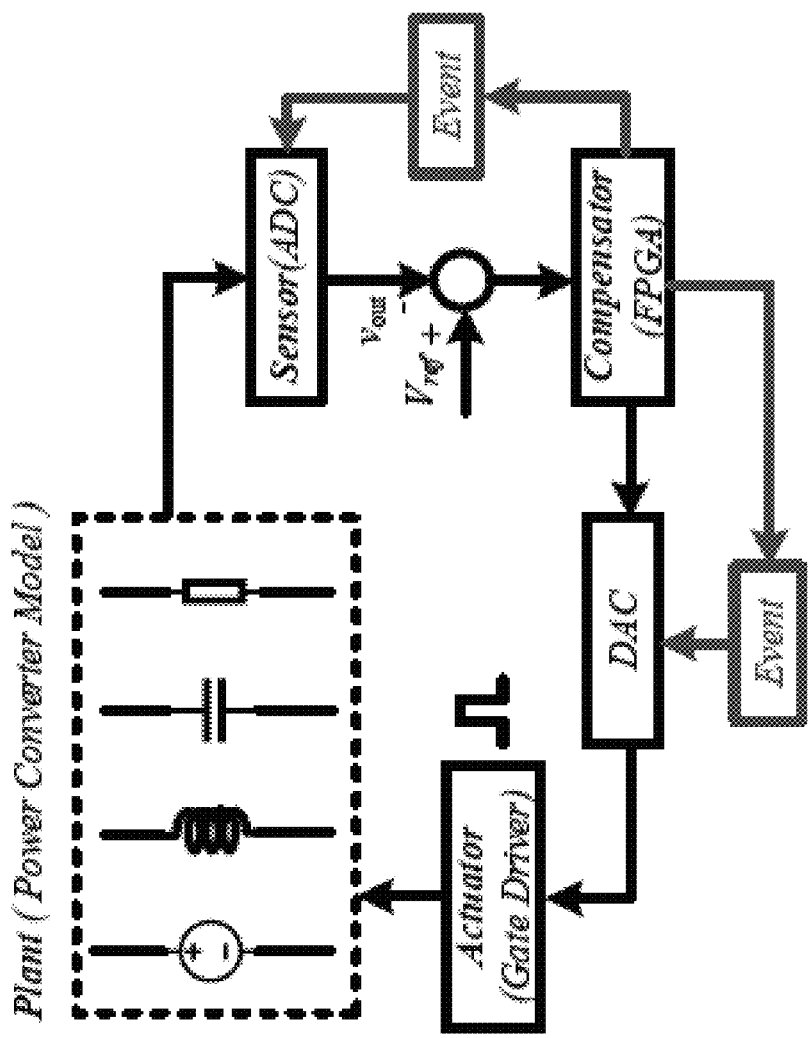
FIG. 9 is a schematic view of a switching synchronized control framework for power converters in accordance with one example.

A high-speed control framework and corresponding digital controller may be provided for power converters with variable switching frequency at multi-megahertz ranges. The digital control framework may provide high accuracy with low sampling and computational burden. The control framework relies on the switching-synchronized sampled-state space (5S) addressed above, which includes a series of non-periodic sampling and control actions, which are triggered by events instead of clocks, as shown in FIG. 9. Further details regarding the control framework are set forth in the above-referenced paper Cui et al., "A new framework for cycle-by-cycle digital control of megahertz-range variable frequency buck converters," the entire disclosure of which is hereby incorporated by reference. The above-referenced and described control framework may also be used in connection with COT-CM boost converters.

The control framework and digital controller may be applied to a constant on-time, current-mode boost voltage regulator. As described below, one example operates in CCM with a peak switching frequency of 3 MHz. It is designed to nominally deliver 16 W of power from a 12 V vehicle battery to a 40 V LiDAR transmitter array. The cycle-by-cycle digital control at this frequency and power level has not been achieved heretofore.

As described below, a COT-CM boost model is shown to match a simulation to within 6% error in a voltage step response test. A root-locus based method is used to provide a robust switching-synchronized proportional-integral (2 S PI) controller by considering the model uncertainties. A converter using the digital 2 S PI controller shows a rise time of 5 µs for a reference voltage step at several operating points ranging from 50% to 100% of the nominal voltage. One example shows a 2.5% voltage deviation under a 40% load step disturbance. These power supply examples are well-suited for LiDAR systems, such as autonomous vehicle LiDAR systems.

Figure 11:
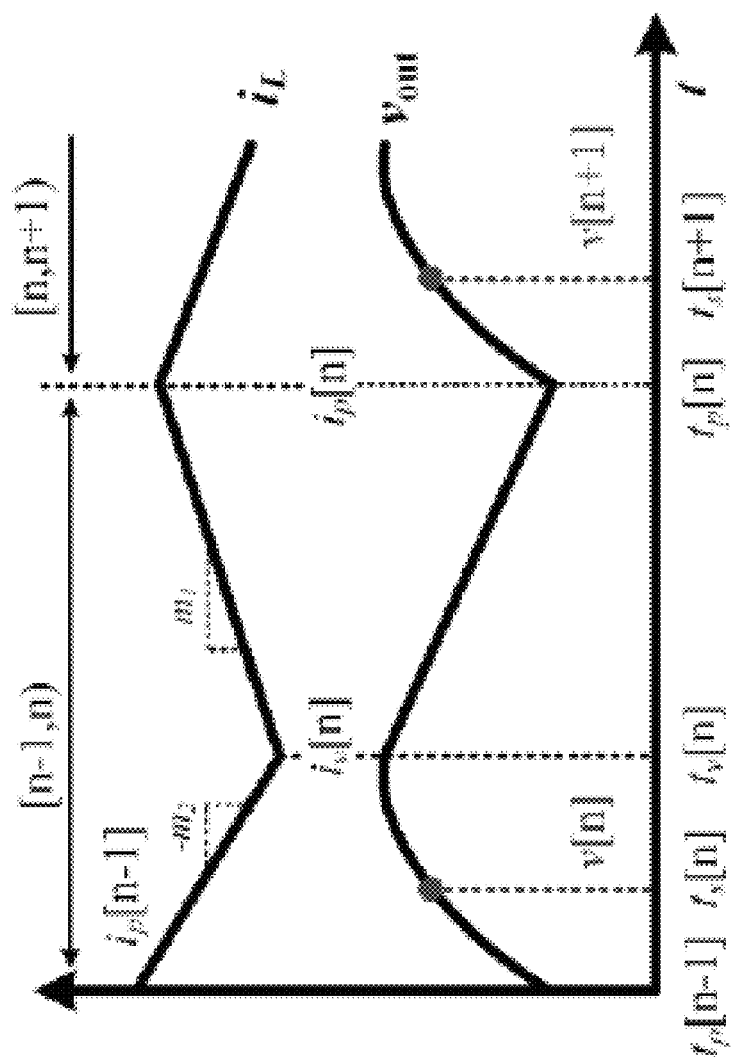
FIG. 11 is a graphical plot of inductor current and capacitor voltage waveforms in a boost converter in accordance with one example.

The above-referenced control framework is now described in connection with an example of a power converter and corresponding controller configuration. In contrast to traditional discrete-time modeling, the output voltage measurement and current control action is updated once every switching cycle, despite a time-varying switching period. The control intervals are switching-synchronous. An example of the control method for the boost converter is illustrated in FIG. 11, where the output voltage is sampled during the off-time $t_s[n]$ and the peak current $i_p[n]$ is measured and controlled by a comparator and digital-to-analog converter (DAC) with corresponding time $t_p[n]$. The output voltage v[n] is sampled cycle-by-cycle. The sampling time point for v[n] can be expressed as the convex combination of the time of the inductor current valley $t_v[n]$, and the time for the inductor current peak $t_p[n]$ as follows:

$$t_s[n]=\lambda t_p[n-1]+(1-\lambda)t_v[n]$$

The parameter λ may be selected from the range 0 to 1. The $\{\Delta i_p[n]\}$ sequence may be considered the input, and the $\{\Delta v[n]\}$ sequence may be considered the output. The difference equation between them may be derived. To facilitate the derivation, the output RC filter time constant may be much greater than the switching period, and the output voltage may have a small ripple so the inductor has a piecewise linear (ramp) waveform.

The theoretical voltage step response shows a good match to the simulation. From FIG. 12, the worst-case error during the entire transient is less than 6%, which can be attributed to the linear current ramp assumption. The steady-state voltage error is less than 0.6%. This error is already lower than the numerical error floor of the simulation, which confirms the steady-state voltage error has effectively been driven to zero.

Unlike the traditional digital current-mode control hardware architecture, which digitally samples or estimates the inductor current, the COT-CM boost regulator described herein includes an analog peak-current-control circuit and digital voltage-control loop as shown in FIG. 10. An example was constructed with the parameters in the table below.

| Peak Switching Frequency | 3 MHz |
| --- | --- |
| Nominal Power | 16 W |
| Input Voltage | 12 V |
| Nominal Output Voltage | 40 V |
| Off-Time | 200 ns |
| L | 6.8 µH |
| C | 1 µF |
| MOSFETs | GS61004B |

The example was controlled by an Artix-7 FPGA from Xilinx. The input voltage 12 V was a common voltage level in a vehicle. The output voltage was selected to be 40 V to represent a laser driver solution, and the power level is set as 16 W based on a commercial example. The peak switching frequency is 3 MHz because LiDAR transmitters tend to be more compact and portable, and high switching frequency largely shrinks the size and weight of circuits.

Figure 12:
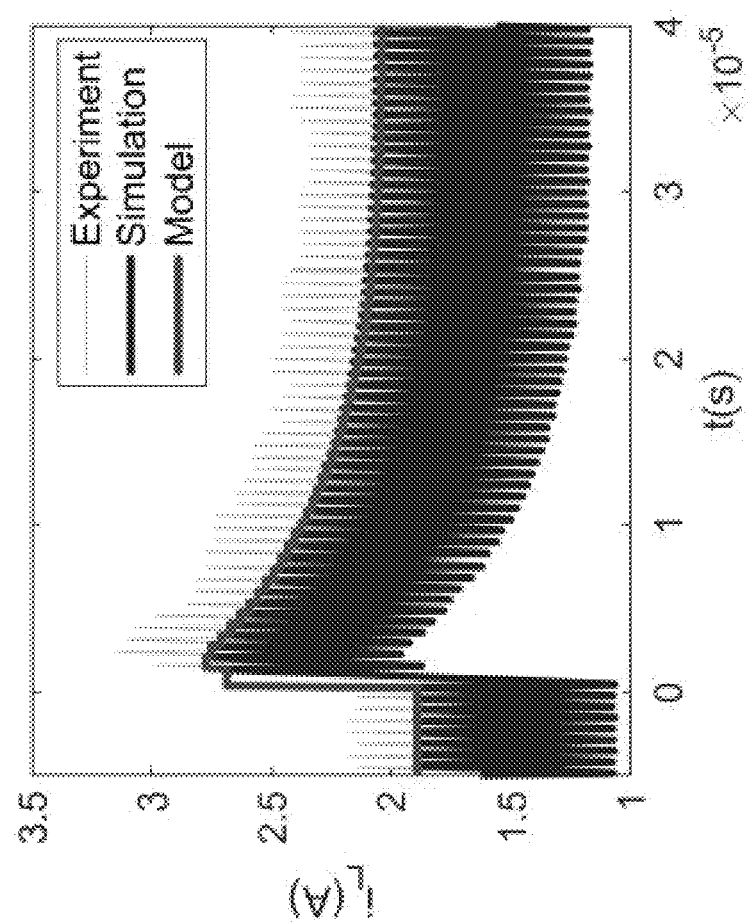
FIG. 12 is a graphical plot of a comparison of inductor current as tested and in theory under an output voltage step response in accordance with one example.
Figure 13:
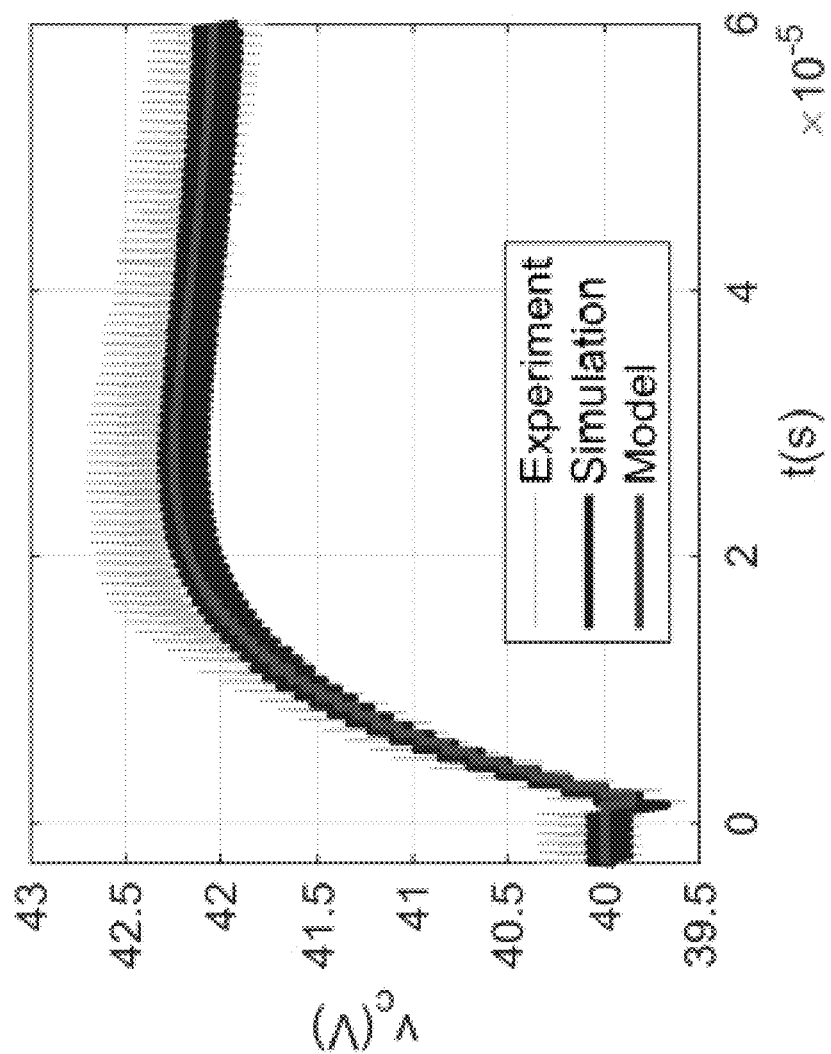
FIG. 13 is a graphical plot of a comparison of capacitor voltage as tested and in theory under an output voltage step response in accordance with one example.

FIGS. 12 and 13 show good agreement between theory, simulation and experiment. The theoretical current is lower than the experimental data by a 10% offset. This deviation is a result of the assumption in the theory that the converter is lossless. The example was instead 90% efficient. The theoretical voltage matches the experimental data in steady-state because of the integrator in the controller. A slight difference in transient trajectories is also due to the unmodeled power loss, such as switching loss. Looking past the switching transients, the actual voltage ripple is around 200 mV in FIG. 13.

Figure 14:
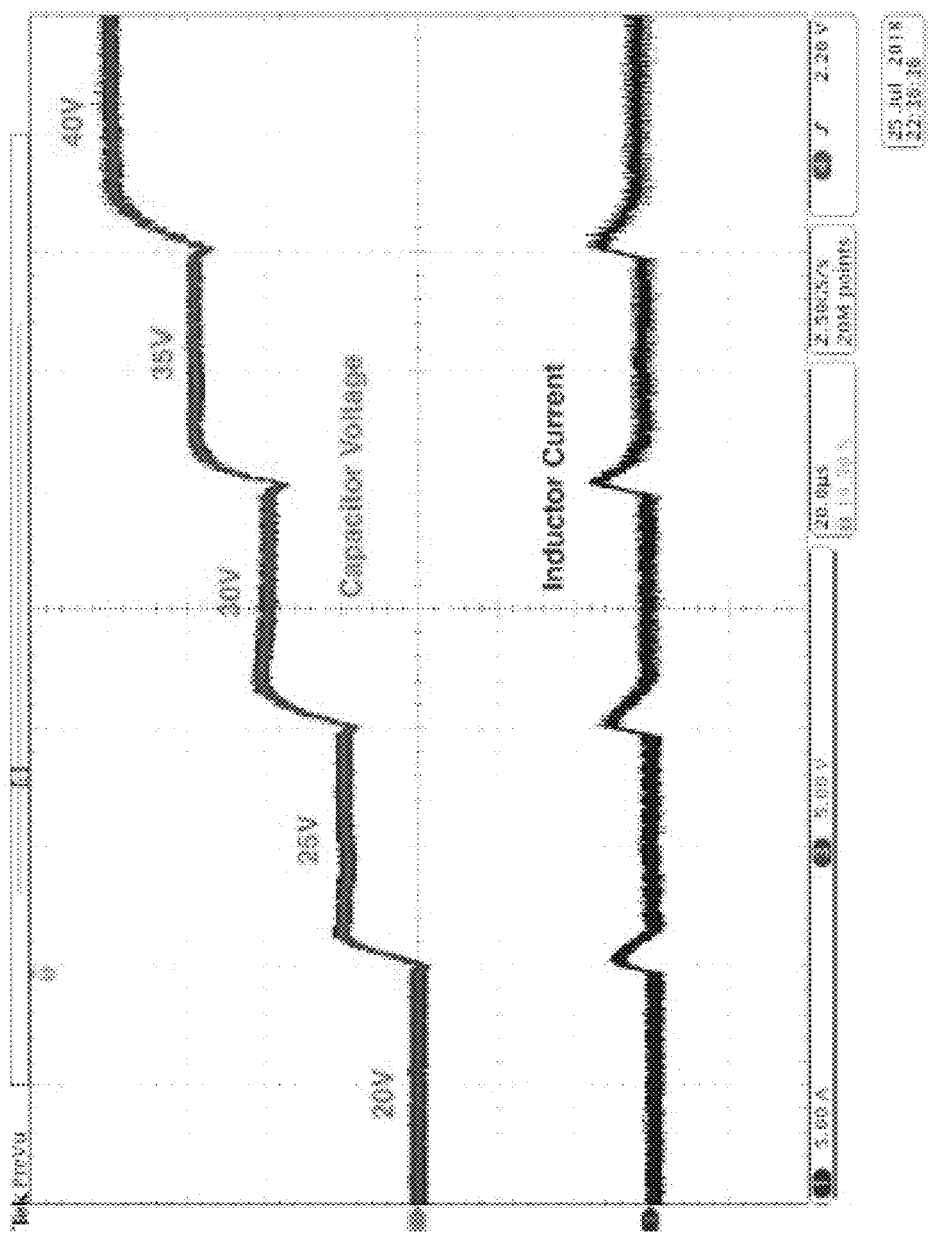
FIG. 14 is a graphical plot of capacitor voltage and inductor current waveforms during dynamic laser pulse energy scaling in accordance with one example.
Figure 15:
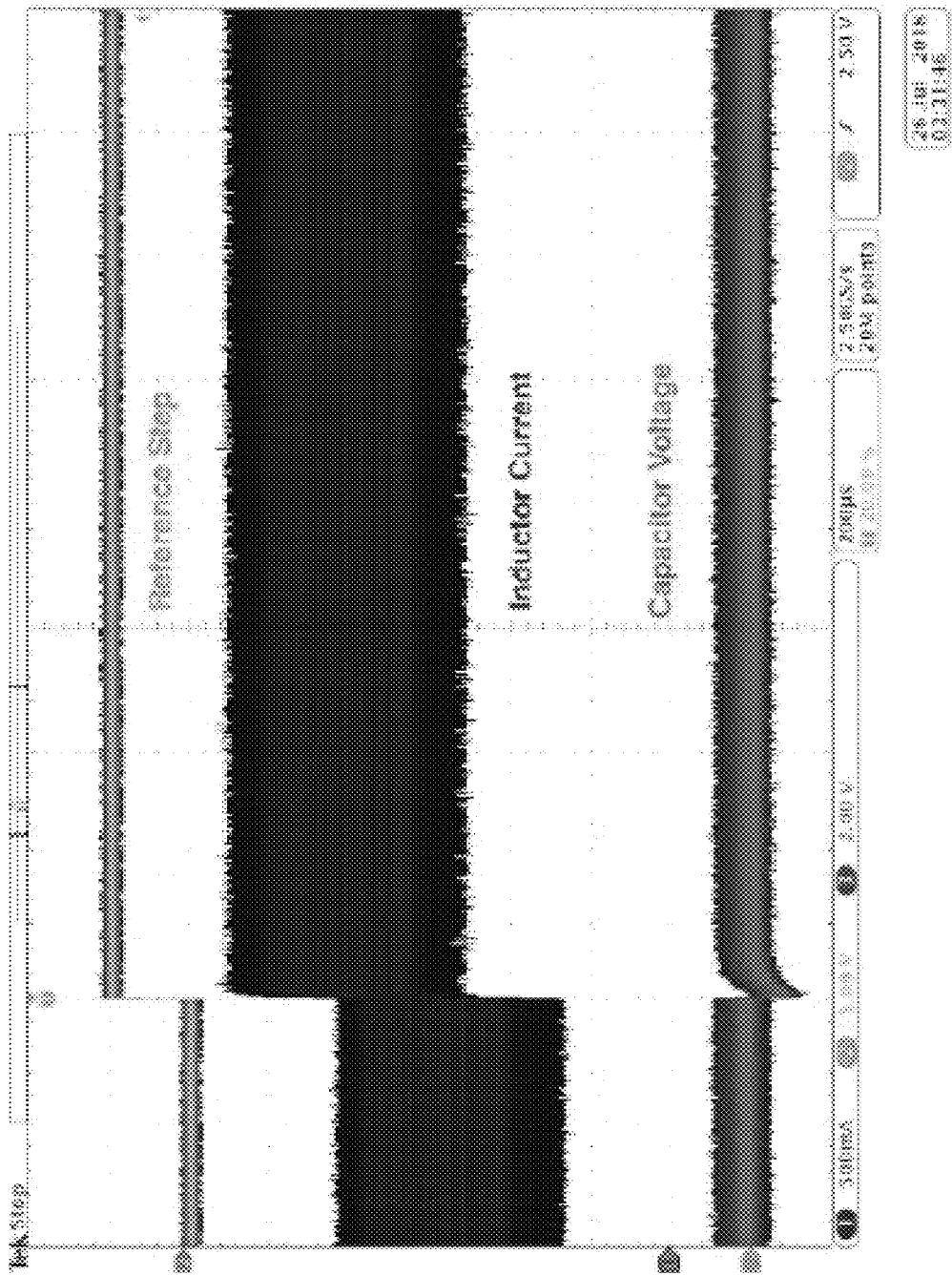
FIG. 15 is a graphical plot of capacitor voltage and inductor current waveforms during a laser pulse repetition rate step up in accordance with one example.

The staircase voltage steps of 20 V→25 V→30 V→35 V→40 V shown in FIG. 14 emulate an example dynamic laser pulse peak power corresponding to 60 W→80 W→100 W→115 W→125 W. Each voltage step exhibits a rise time of approximately 5 µs with small overshoot, which satisfies the dynamic performance parameters of state-of-the-art LiDAR transmitter products. A load step from 16 W to 22.4 W at 40 V output voltage shown in FIG. 15 emulates a laser pulse repetition rate step-up from 700 kHz to 1 MHz. Under a large load disturbance, the maximum voltage deviation is 1 V, which is within the 5% capacitor bank discharge limit.

Figure 16:
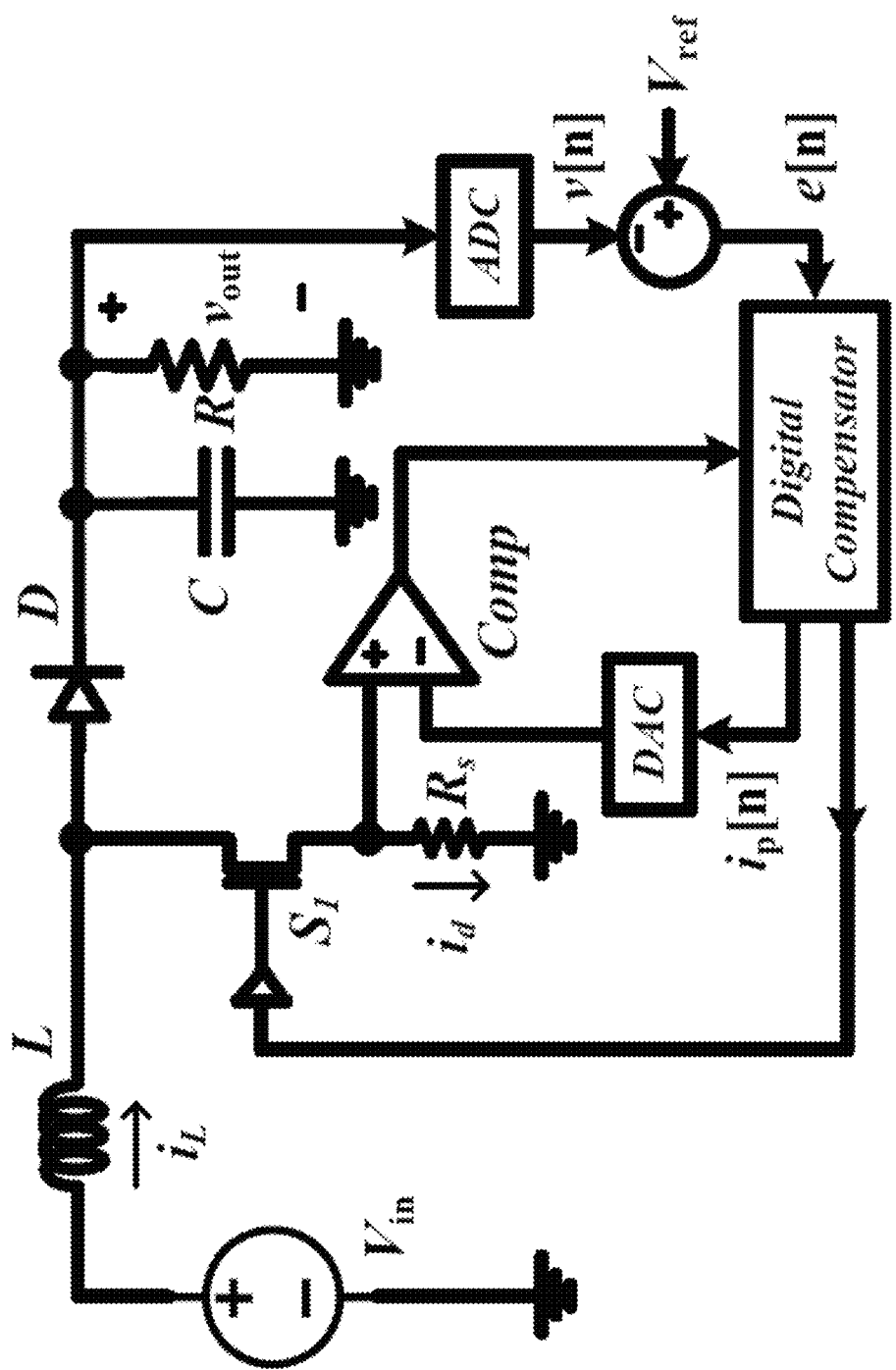
FIG. 16 is a schematic view of a current-mode, constant off-time boost converter having a saturating inductor and cycle-by-cycle digital control in accordance with one example.

FIG. 16 is a schematic view of a current-mode, constant off-time boost converter having a saturating inductor and cycle-by-cycle digital control in accordance with one example. The boost converter may include one or more elements or aspects similar to the examples described herein.

Figure 17:
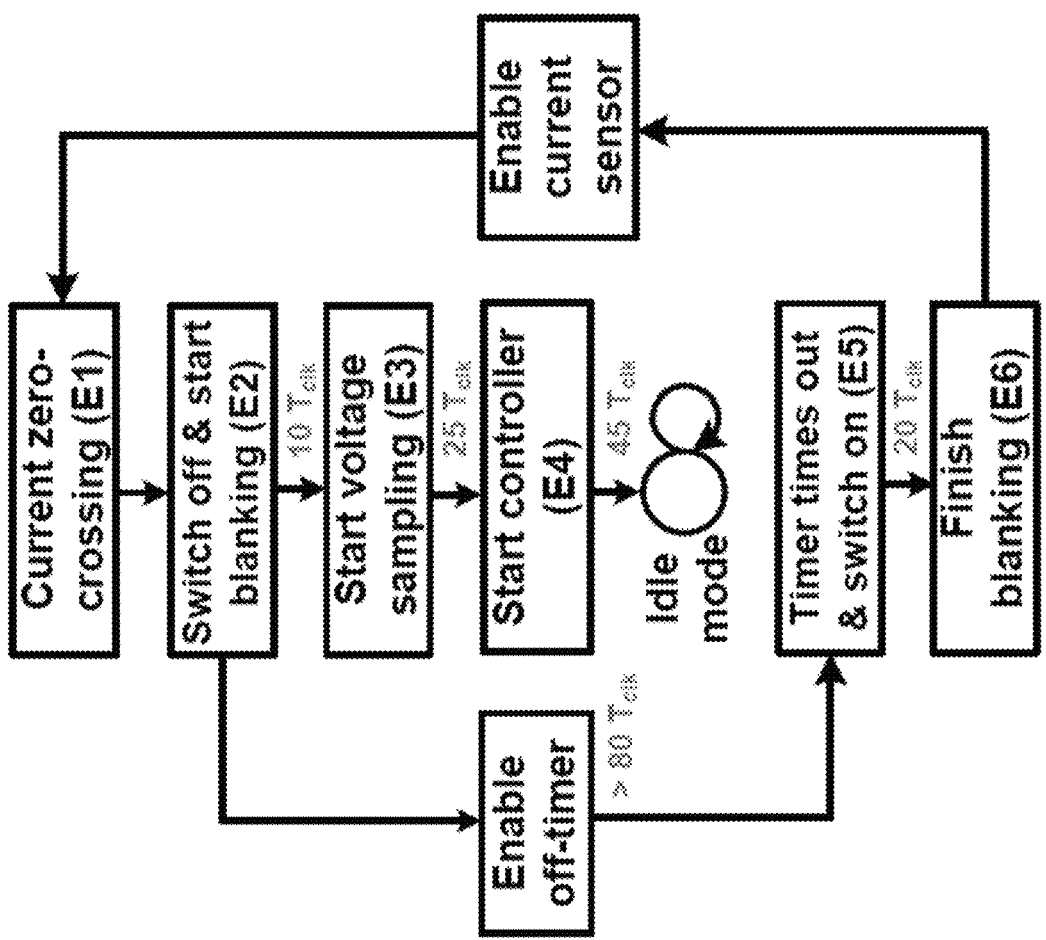
FIG. 17 is a flow diagram of a method of switching synchronized sampling and control of a current-mode, constant off-time boost converter in accordance with one example.

FIG. 17 is a flow diagram of a method of switching synchronized sampling and control of a current-mode, constant off-time boost converter in accordance with one example. The method may be implemented by any one of the boost converters described herein, including, for instance, the boost converter described in connection with FIG. 16, and/or another boost converter.

Described above are examples of a cycle-by-cycle digital control framework for a variable frequency boost converter. Experimental data on a 3 MHz peak frequency COT-CM boost converter prototype matched the model. The disclosed converter exhibited an exceptionally fast dynamic response. The disclosed converter is well-suited for automatic power control of LiDAR transmitters and other devices and systems.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device for power conversion, the device comprising:
   an inductor;
   a switch having a switching cycle to control current flow through the inductor;
   a sensor coupled to the inductor to generate a signal representative of the current flow through the inductor;
   a controller configured to generate a switch control signal for the switch to implement cycle-by-cycle control of the switching cycle for current-mode control of an output driven by the current flow through the inductor, the controller being coupled to the sensor such that the cycle-by-cycle control is based on the signal representative of the current flow through the inductor, the controller being configured to implement non-periodic sampling and control actions triggered by switch activation events and switch deactivation events rather than a clock; and a comparator that couples the sensor to the controller to compare the signal representative of the current flow through the inductor with a desired current level generated by the controller;

wherein the inductor is configured to exhibit a decrease in inductance with an increase in the current flow through the inductor;

wherein the controller is triggered by detection of the current flow passing a valley current level or a peak current level; and wherein the cycle-by-cycle control implemented by the controller generates the switch control signal using measurement of the signal representative of the current flow through the inductor during only a single instance of the switching cycle such that the switch control signal is updated once every switching cycle.

2. The device of claim 1, wherein the power conversion is dynamic voltage scaling.

3. The device of claim 1, wherein the power conversion is a regulated output responding to a fast load change.

4. The device of claim 1, wherein the switching cycle is variable frequency.

5. The device of claim 1, wherein the switching cycle is fixed frequency in the steady state.

6. The device of claim 1, wherein the output is a voltage.

7. The device of claim 1, wherein the output is a current.

8. The device of claim 1, wherein an output ripple of the output does not contain subharmonics.

9. The device of claim 1, wherein the inductor is configured to exhibit a hard saturation upon the increase in the current flow through the inductor.

10. The device of claim 1, wherein the inductor is configured to operate in saturation during a step-up transient in a desired voltage level for the output voltage.

11. The device of claim 1, wherein the inductor is configured as a composite inductor.

12. The device of claim 1, wherein the inductor comprises a plurality of inductances, each inductance of the plurality of inductances being configured to saturate at a different current level.

13. The device of claim 1, wherein the controller is configured to implement a control scheme for a buck converter operating in constant on-time mode.

14. The device of claim 1, wherein the controller is configured to implement a control scheme for a boost converter operating in constant off-time mode.

15. The device of claim 1, further comprising a laser pulse driver coupled to the inductor to receive the output voltage driven by the current flow through the inductor.

16. A light detection and ranging (LiDAR) system comprising:
a laser pulse driver; and
a power converter coupled to the laser pulse driver to provide dynamic voltage scaling for the laser pulse driver;

wherein the power converter comprises:
an inductor;
a switch having a switching cycle to control current flow through the inductor;
a sensor coupled to the inductor to generate a signal representative of the current flow through the inductor;
a controller configured to generate a switch control signal for the switch to implement cycle-by-cycle control of the switching cycle for current-mode control of an output voltage driven by the current flow through the inductor, the controller being coupled to the sensor such that the cycle-by-cycle control is based on the signal representative of the current flow through the inductor, the controller being configured to implement non-periodic sampling and control actions triggered by switch activation events and switch deactivation events rather than a clock; and
a comparator that couples the sensor to the controller to compare the signal representative of the current flow through the inductor with a desired current level generated by the controller;
wherein the inductor is configured to exhibit a decrease in inductance with an increase in the current flow through the inductor;
wherein the controller is triggered by detection of the current flow passing a valley current level or a peak current level; and
wherein the cycle-by-cycle control implemented by the controller generates the switch control signal using measurement of the signal representative of the current flow through the inductor during only a single instance of the switching cycle such that the switch control signal is updated once every switching cycle.

17. The LiDAR system of claim 16, wherein the switching cycle is variable frequency.

18. The LiDAR system of claim 16, wherein the switching cycle is fixed frequency in the steady state.

19. The LiDAR system of claim 16, wherein the output is a voltage.

20. The LiDAR system of claim 16, wherein the output is a current.

21. The LiDAR system of claim 16, wherein the controller is configured to implement a control scheme for a boost converter operating in constant off-time mode.

22. The LiDAR system of claim 16, wherein the inductor is configured to operate in saturation during a step-up transient in a desired voltage level for the output voltage.

23. The LiDAR system of claim 16, wherein the inductor is configured as a composite inductor.

24. The LiDAR system of claim 16, wherein the inductor comprises a plurality of inductances, each inductance of the plurality of inductances being configured to saturate at a different current level.

* * * * *